US012321117B2

(12) United States Patent
Obata

(10) Patent No.: US 12,321,117 B2
(45) Date of Patent: Jun. 3, 2025

(54) FIXING DEVICE IN WHICH A POWER SUPPLY TERMINAL IN CONTACT WITH AN ELECTRODE OF A HEATER AND A POWER SUPPLY CABLE ARE ARRANGED IN AN INTERNAL SPACE OF A FILM

(71) Applicant: CANON KABUSHIKI KAISHA, Tokyo (JP)

(72) Inventor: Seiji Obata, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 18/329,238

(22) Filed: Jun. 5, 2023

(65) Prior Publication Data

US 2023/0393507 A1 Dec. 7, 2023

(30) Foreign Application Priority Data

Jun. 6, 2022 (JP) ................................ 2022-091291

(51) Int. Cl.
*G03G 15/20* (2006.01)

(52) U.S. Cl.
CPC ................................ *G03G 15/2057* (2013.01)

(58) Field of Classification Search
USPC .......................................................... 399/300
See application file for complete search history.

(56) References Cited

U.S. PATENT DOCUMENTS

2017/0075266 A1* 3/2017 Mochizuki ......... G03G 15/2053
2022/0043379 A1* 2/2022 Endo .................... G03G 15/205

FOREIGN PATENT DOCUMENTS

| | | | |
|---|---|---|---|
| EP | 3916488 | A1 | 12/2021 |
| JP | 2017156635 | A | 9/2017 |
| JP | 2020095157 | A | 6/2020 |
| JP | 2020101677 | A | 7/2020 |
| JP | 2022151529 | A | 10/2022 |

* cited by examiner

*Primary Examiner* — Quana Grainger
(74) *Attorney, Agent, or Firm* — Canon U.S.A., Inc. I.P. Divison

(57) ABSTRACT

In a fixing device, a connection portion of a first power supply terminal is at a position closer to one end portion of a heater in a longitudinal direction of the heater than a contact portion of the first power supply terminal, and a connection portion of a second power supply terminal is at a position closer to the other end portion of the heater in the longitudinal direction than a contact portion of the second power supply terminal. A power supply cable connected to the connection portion of the first power supply terminal extends toward the one end portion of the heater, and a power supply cable connected to the connection portion of the second power supply terminal is bent from extending toward the other end portion of the heater to extend toward the one end portion of the heater.

5 Claims, 11 Drawing Sheets

FIXING DEVICE IN WHICH A POWER SUPPLY TERMINAL IN CONTACT WITH AN ELECTRODE OF A HEATER AND A POWER SUPPLY CABLE ARE ARRANGED IN AN INTERNAL SPACE OF A FILM

BACKGROUND OF THE INVENTION

Field of the Invention

The present invention relates to a fixing device mounted on an image forming apparatus such as a printer or copier that uses an electrophotographic recording method or an electrostatic recording method.

Description of the Related Art

In general, when small-size sheets are consecutively printed, a non-sheet-passing portion of a fixing device may overheat due to a reduction in heat transferred to the recording material. A fixing device using a cylindrical film (belt) has a small heat capacity and thus is less likely to conduct heat in the longitudinal direction of the fixing device, and thus the degree of temperature rise of a non-sheet-passing portion tends to increase. The overheating damages components of the fixing device.

Therefore, there has been conceived a fixing device in which a heat generating element on a heater substrate is divided into a plurality of heat generating blocks in the longitudinal direction of a heater, so that a heat generation distribution corresponding to the size of a recording material can be formed (Japanese Patent Application Laid-Open No. 2020-095157). In the heater discussed in Japanese Patent Application Laid-Open No. 2020-095157, an electrode (a terminal of the heater) on the heater substrate is in contact with a power supply terminal for supplying power to the heat generating element, and is disposed within an area where the heat generating element is disposed in the longitudinal direction of the heater, in order to suppress an increase in the size of the heater substrate.

In the case of the heater in which the heat generation distribution corresponding to the size of the recording material can be formed, the size of a heat generating block disposed at a position close to an end portion of the heater in the longitudinal direction of the heater is smaller in the longitudinal direction of the heater than the size of a heat generating block disposed as the middle. It is necessary to dispose the electrode in this small area of the heat generating block, and the power supply terminal in contact with the electrode also needs to be disposed in a small area, so as not to short-circuit electrically with an adjacent power supply terminal. However, because a power supply cable is connected to the power supply terminal, the smaller the size of one heat generating block is, the more difficult it is to arrange the power supply terminal and the power supply cable.

SUMMARY OF THE INVENTION

The present invention is directed to providing a fixing device in which a power supply terminal in contact with an electrode of a heater and a power supply cable are efficiently arranged in an internal space of a film.

According to an aspect of the present invention, a fixing device that fixes a toner image formed on a recording material to the recording material by heat includes a film having a cylindrical shape, a heater in an internal space of the film, the heater including a substrate, and a plurality of heat generating blocks located on the substrate and arranged in a longitudinal direction of the heater, a plurality of power supply terminals in contact with electrodes of the respective plurality of heat generating blocks, and a plurality of power supply cables connected to the respective plurality of power supply terminals, wherein each of the plurality of power supply terminals includes a contact portion in contact with the electrode and a connection portion connected to the power supply cable, wherein the plurality of heat generating blocks includes a first heat generating block and a second heat generating block next to each other in the longitudinal direction, wherein the plurality of power supply terminals includes a first power supply terminal in contact with the first heat generating block and a second power supply terminal in contact with the second heat generating block, the first power supply terminal and the second power supply terminal being located in the internal space of the film, wherein the connection portion of the first power supply terminal is at a position closer to one end portion of the heater in the longitudinal direction than the contact portion of the first power supply terminal, and the connection portion of the second power supply terminal is at a position closer to the other end portion of the heater in the longitudinal direction than the contact portion of the second power supply terminal, wherein the power supply cable connected to the connection portion of the first power supply terminal extends toward the one end portion of the heater, and wherein the power supply cable connected to the connection portion of the second power supply terminal is bent from extending toward the other end portion of the heater to extend toward the one end portion of the heater.

According to another aspect of the present invention, a fixing device that fixes a toner image formed on a recording material to the recording material by heat includes a film having a cylindrical shape, a heater in an internal space of the film, the heater including a substrate, and a plurality of heat generating blocks located on the substrate and arranged in a longitudinal direction of the heater, a plurality of power supply terminals in contact with electrodes of the respective plurality of heat generating blocks, and a plurality of power supply cables connected to the respective plurality of power supply terminals, wherein a part of the plurality of power supply cables extends from one end portion of the film in the longitudinal direction to an outside of the film, and a rest of the plurality of power supply cables extends from the other end portion of the film in the longitudinal direction to the outside of the film, and wherein a number of the power supply cables extending from the one end portion of the film to the outside of the film is an even number, and a number of the power supply cables extending from the other end portion of the film to the outside of the film is an odd number.

Further features of the present invention will become apparent from the following description of exemplary embodiments with reference to the attached drawings.

DESCRIPTION OF THE EMBODIMENTS

Exemplary Embodiment (Summary of Image Forming Apparatus)

Figure 1:
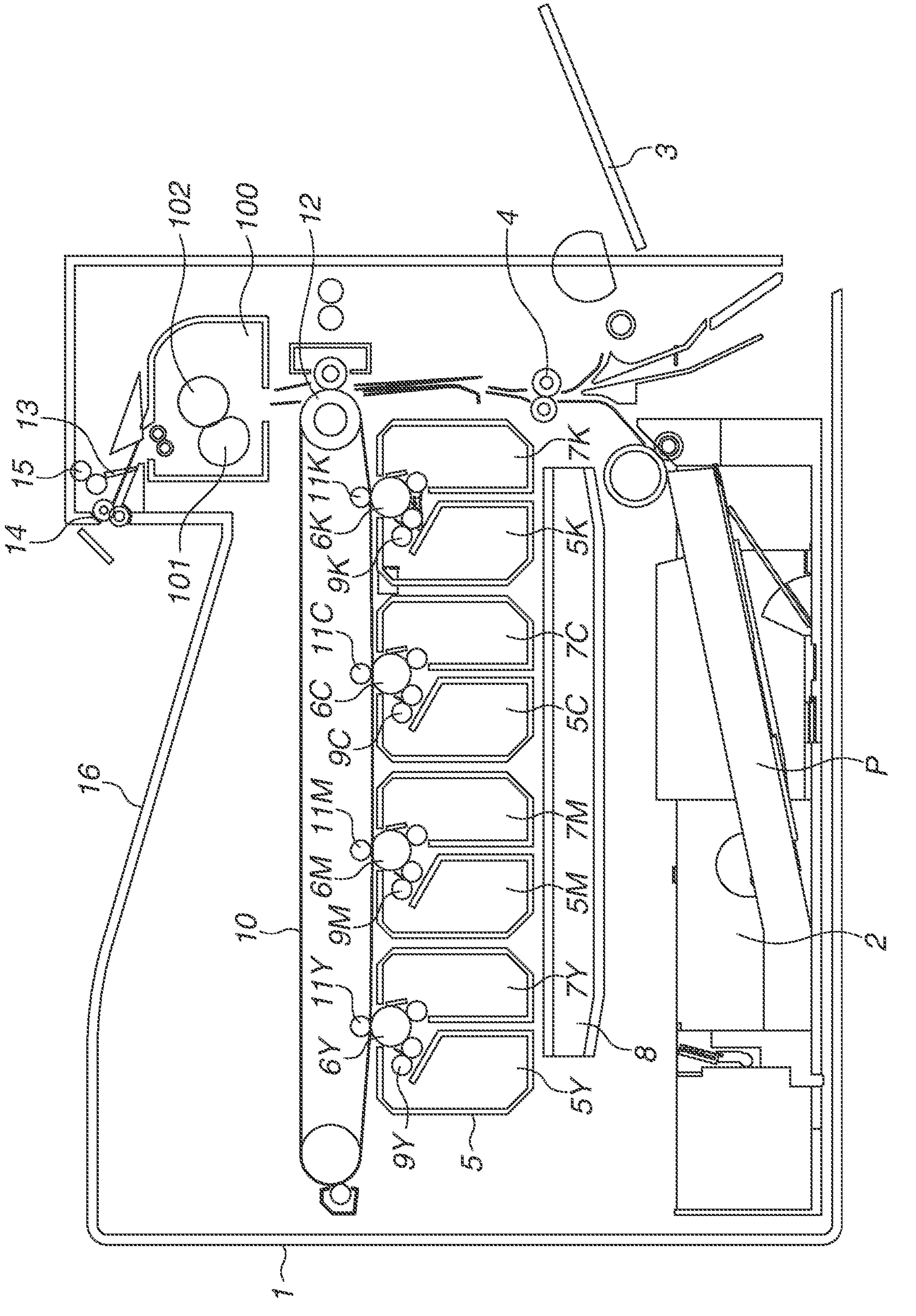
FIG. 1 is a sectional view of an image forming apparatus.

First, an image forming apparatus to which the present invention is applicable will be described. FIG. 1 is a sectional view of an overall configuration of a printer 1 (the image forming apparatus) according to an exemplary embodiment. A sheet feeding cassette 2 is housed in a lower part of the printer 1, in a drawable manner. On the right side of the printer 1, a manual feed unit 3 is disposed. Recording materials P are stacked in each of the sheet feeding cassette 2 and the manual feed unit 3, and the recording materials P are to be separated and fed one by one to a registration roller 4. The printer 1 includes an image forming unit 5 in which image forming stations 5Y, 5M, 5C, and 5K corresponding to colors of yellow, magenta, cyan, and black, respectively, are arranged side by side. The image forming unit 5 forms a toner image to be transferred onto the recording material P. In the image forming unit 5, photosensitive drums 6Y, 6M, 6C, and 6K each serving as an image bearing member are arranged, and further, charging devices 7Y, 7M, 7C, and 7K that each uniformly charge the surface of the corresponding photosensitive drum 6 are arranged. In the following, the photosensitive drums 6Y, 6M, 6C, and 6K may be collectively referred to as the photosensitive drum 6. Further, a scanner unit 8 that forms an electrostatic latent image on the photosensitive drum 6 by emitting a laser beam based on image information is disposed, and development devices 9Y, 9M, 9C, and 9K that each develop the electrostatic latent as a toner image by attaching toner to the electrostatic latent are arranged, in the image forming unit 5. Furthermore, primary transfer units 11Y, 11M, 11C, and 11K that each transfer the toner image on the photosensitive drum 6 to a transfer belt 10 are arranged in the image forming unit 5. The primary transfer units 11Y, 11M, 11C, and 11K may be collectively referred to as the primary transfer unit 11.

The toner image on the transfer belt 10, to which the toner image has been transferred by the primary transfer unit 11, is transferred to the recording material P by a secondary transfer unit 12. When passing through a fixing device 100, the toner image is fixed to the recording material P by a heating unit 101 and a pressure roller (a roller) 102 in pressure contact with the heating unit 101, by heat and pressure. Afterward, the conveyance direction of the recording material P is changed by a both-sided flapper 13, and the recording material P is subsequently conveyed to a discharge roller pair 14 or a switchback roller pair 15. The recording material P in the case of single-sided printing is conveyed to the discharge roller pair 14, upon passing through the fixing device 100. The recording material P in the case of double-sided printing is conveyed to the switchback roller pair 15, and reversed in the conveyance direction by the switchback roller pair 15. The reversed recording material P is conveyed to the discharge roller pair 14, upon passing through the registration roller 4, the secondary transfer unit 12, and the fixing device 100 again. Finally, upon passing through the discharge roller pair 14, the recording material P is discharged to a stacking unit 16. While the full-color laser beam printer including the plurality of photosensitive drums 6 is described as the image forming apparatus, the present invention is also applicable to a fixing device mounted on a monochromatic copier or printer that includes one photosensitive drum 6.

(Fixing Device)

Figure 2:
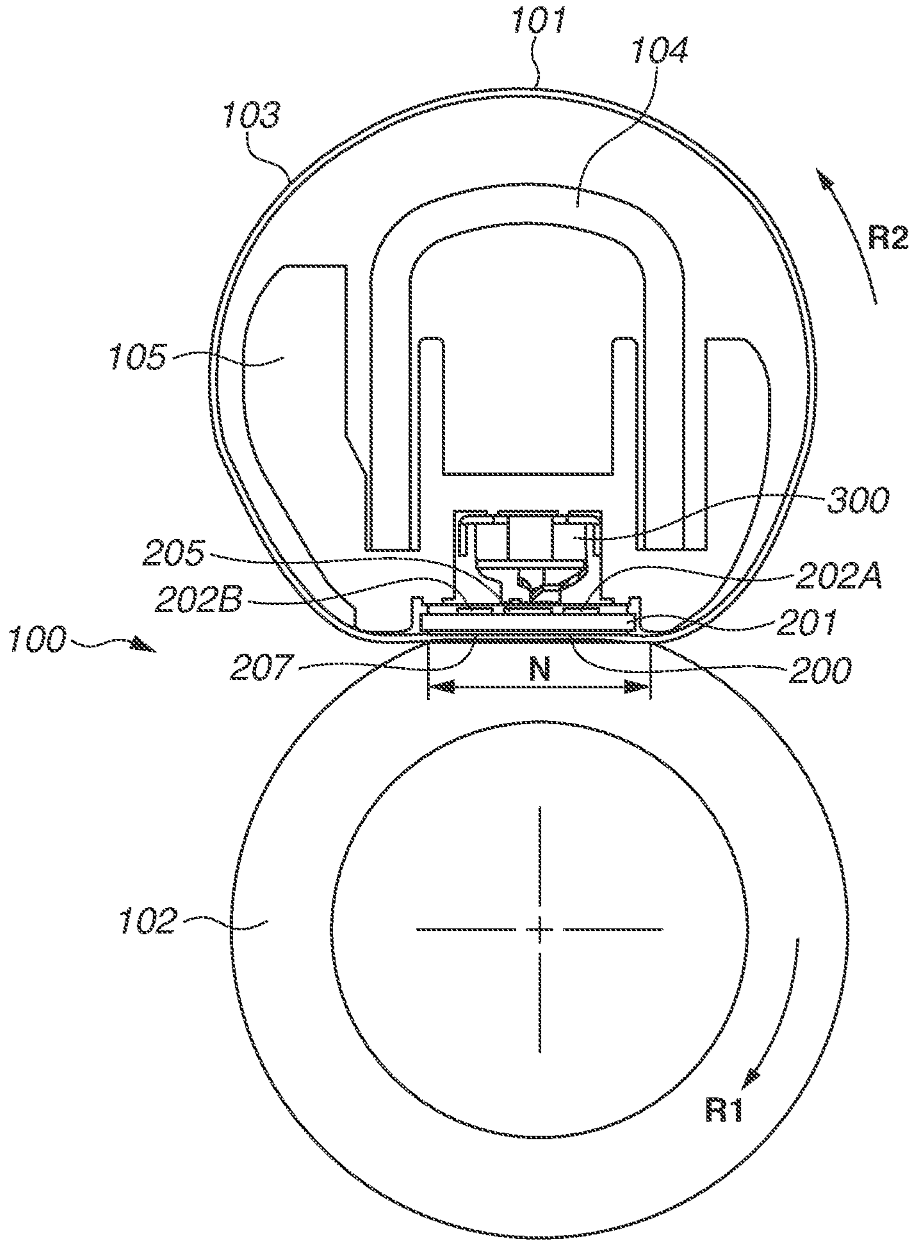
FIG. 2 is a sectional view of a heating unit and a pressure roller.
Figure 3:
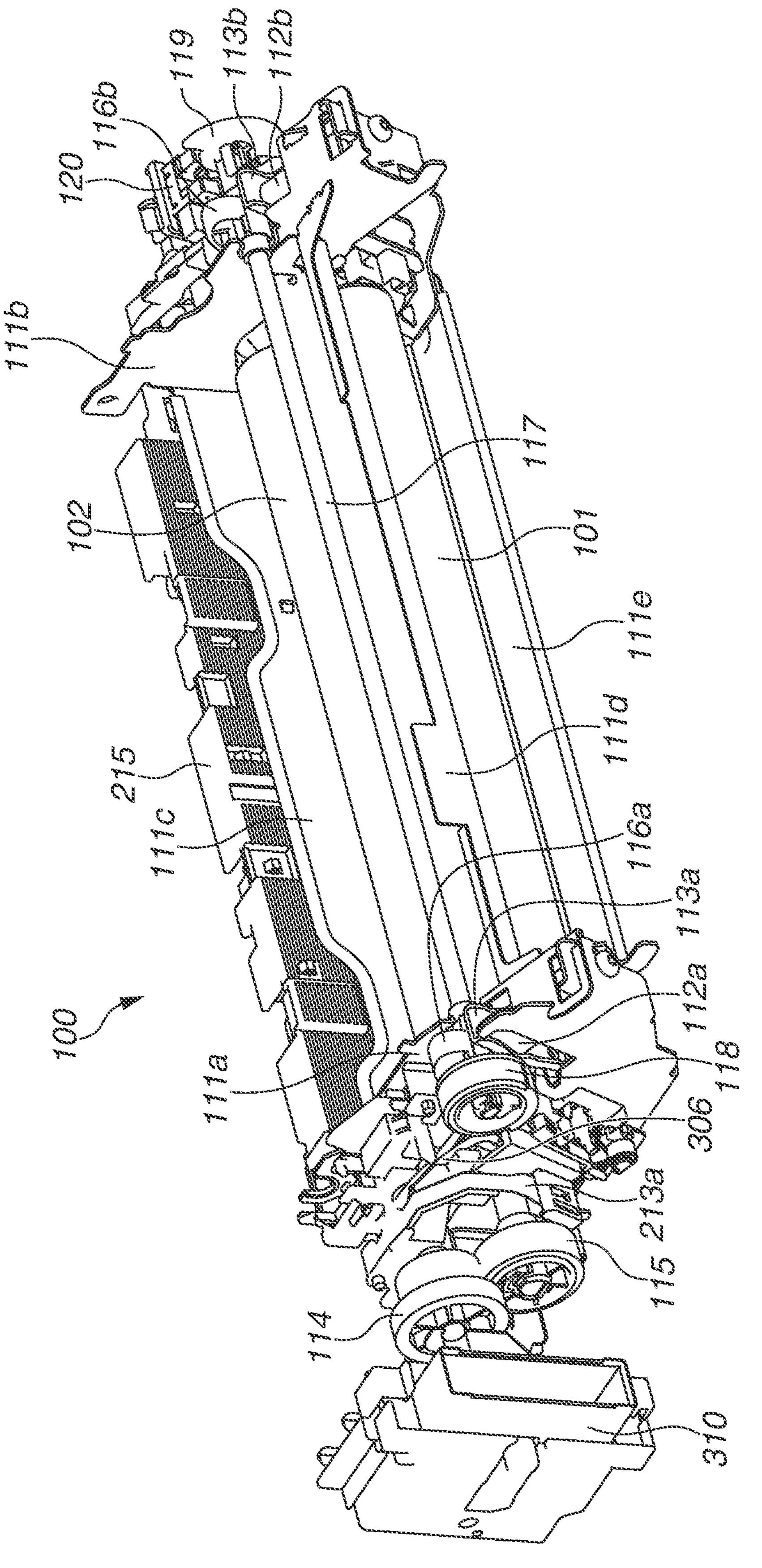
FIG. 3 is a perspective view of a fixing device as viewed from the front.
Figure 4:
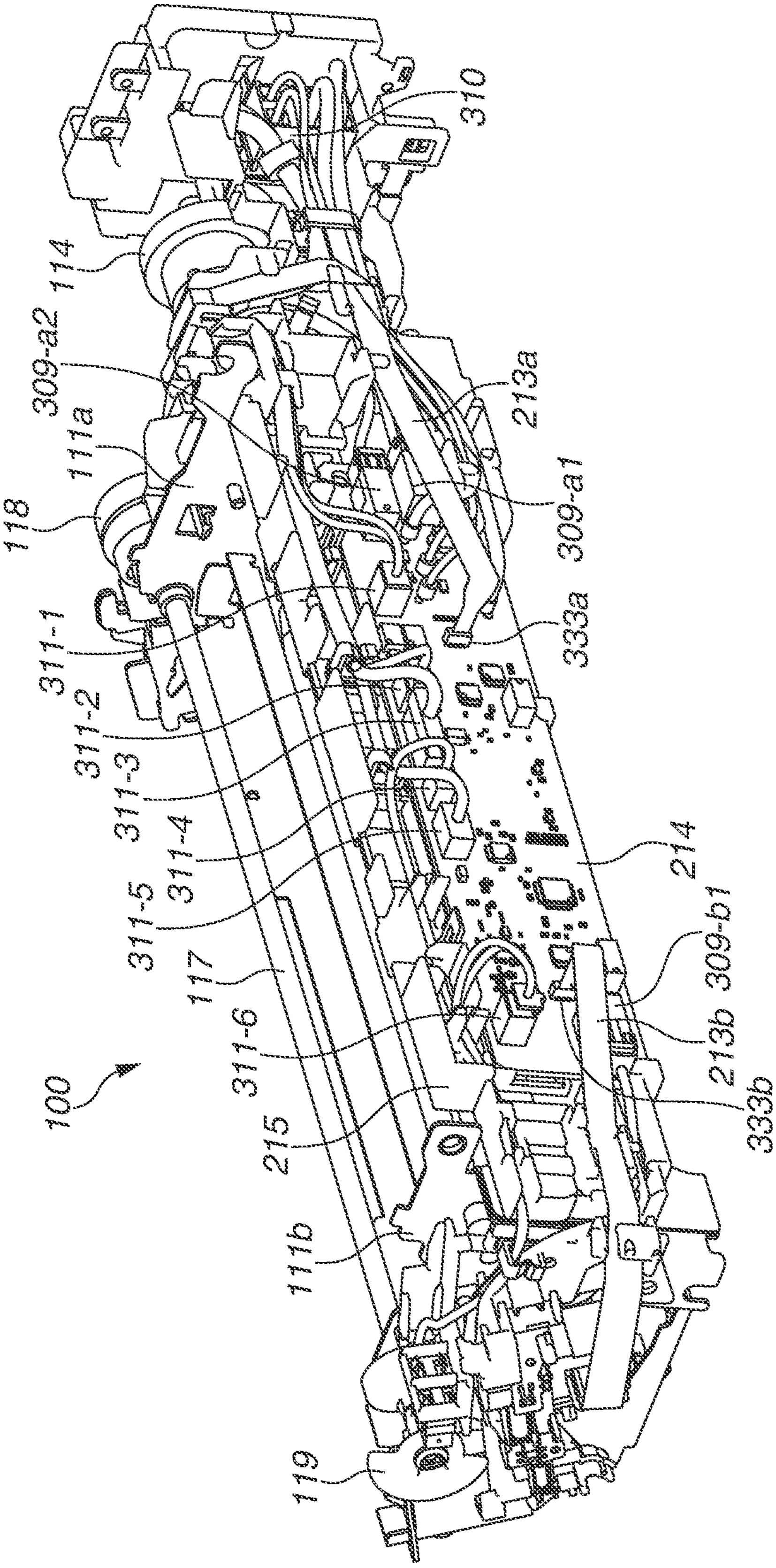
FIG. 4 is a perspective view of the fixing device as viewed from the rear.

Next, the fixing device 100 according to the present exemplary embodiment will be described with reference to FIGS. 2, 3, and 4. The fixing device 100 is a fixing unit that fixes the toner image on the recording material P to the recording material P by heat and pressure. The fixing device 100 includes support frames 111 (111*a* to 111*e*), the heating unit 101, and the pressure roller 102. FIG. 2 is a sectional view of the heating unit 101 and the pressure roller 102 disposed inside the fixing device 100. FIG. 3 is a perspective view of the fixing device 100 as viewed from the front, and FIG. 4 is a perspective view of the fixing device 100 as viewed from the rear.

The heating unit 101 includes a film 103 having a cylindrical shape, and including a base layer made of metal such as stainless steel (SUS) or heat-resistant resin such as polyimide. In addition, a heater 200 and a holding member 105 holding the heater 200 are disposed in an internal space of the film 103. The holding member 105 is made of a material having heat resistance and slidability, such as heat-resistant resin, e.g., a liquid crystal polymer. Further, a stay member 104 made of metal and reinforcing the holding member 105 is also disposed in the internal space of the film 103. At each of both end portions of the film 103 in the film longitudinal direction, a film flange 110 (110*a*, 110*b*) supported by the stay member 104 and supporting the inner surface of the end portion of the film 103 to regulate the position of the film 103 in the film longitudinal direction is disposed.

The heater 200 includes a heater substrate 201, a sliding layer (a glass layer) 207 in contact with the film 103, and heat generating elements 202A and 202B. The heat generating elements 202A and 202B are disposed on the back surface (the surface opposite to the surface where the sliding layer 207 is disposed) of the heater substrate 201. The heat of the heat generating elements 202A and 202B is transmitted to the film 103 via the heater substrate 201 and the sliding layer 207. The longitudinal direction of the heater 200 (i.e., the longitudinal direction of the film 103) is the same as the width direction (the direction orthogonal to the conveyance direction) of the recording material P.

The pressure roller (the roller) 102 includes a metal core portion made of metal and an elastic layer made of silicone rubber or the like, and is rotatably supported by the support frames 111*a* and 111*b* via a bearing (not illustrated). The pressure roller 102 is in contact with an outer peripheral surface of the film 103. The heating unit 101 is supported by the support frames 111*a* and 111*b* in a manner movable in a direction for pressure contact via the film flange 110. Further, the heating unit 101 is urged by a pressure spring 112 (112*a*, 112*b*) to be described below toward the pressure roller 102, via the film flange 110 and the stay member 104. In other words, the heating unit 101 is urged toward the pressure roller 102, and a fixing nip portion N is formed by the heating unit 101 and the pressure roller 102. To be more specific, the film 103 is interposed between the heater 200 and the pressure roller 102, and the fixing nip portion N for pinching and conveying the recording material P is formed between the film 103 and the pressure roller 102. A metal plate superior in heat conduction may be interposed between the film 103 and the heater 200.

A driving force from a motor (not illustrated) disposed in the printer 1 is transmitted to an idler gear 114. A drive gear 115 is attached to the metal core portion of the pressure roller 102, and the drive gear 115 meshes with the idler gear 114. The driving force is transmitted to the drive gear 115, so that the pressure roller 102 is rotated in a rotation direction R1. Further, the film 103 is driven to rotate in a rotation direction R2 by a contact frictional force between the pressure roller 102 and the film 103.

The pressure spring 112 is a spring (in this example, a compression spring) that applies an urging force to bring the heating unit 101 into pressure contact with the pressure roller 102. The pressure spring 112 urges each of both end portions of the heating unit 101 toward the pressure roller 102 via a lever member 113 (113*a*, 113*b*), the film flange 110, and the stay member 104.

A cam 116 (116*a*, 116*b*) presses the lever member 113 in the direction opposite to the urging direction of the pressure spring 112 at the time of a predetermined rotation phase, thereby reducing (or eliminating) the nip pressure of the fixing nip portion N. The reduced-pressure (or eliminated-pressure) state is set at the time when the recording material P jams, the time when the printer 1 is powered off, or the like. The two cams 116*a* and 116*b* are connected by a camshaft 117 having end portions to which a cam gear 118 and a flag 119 are attached, and the cams 116*a* and 116*b* are rotated by transmission of a driven force to the cam gear 118 by a drive unit (not illustrated) disposed in the printer 1. The rotation phase of the cam 116 is detected by the flag 119 and a sensor 120, and the rotation of the cam 116 is controlled based on a detection signal.

(Heater)

Figure 5:
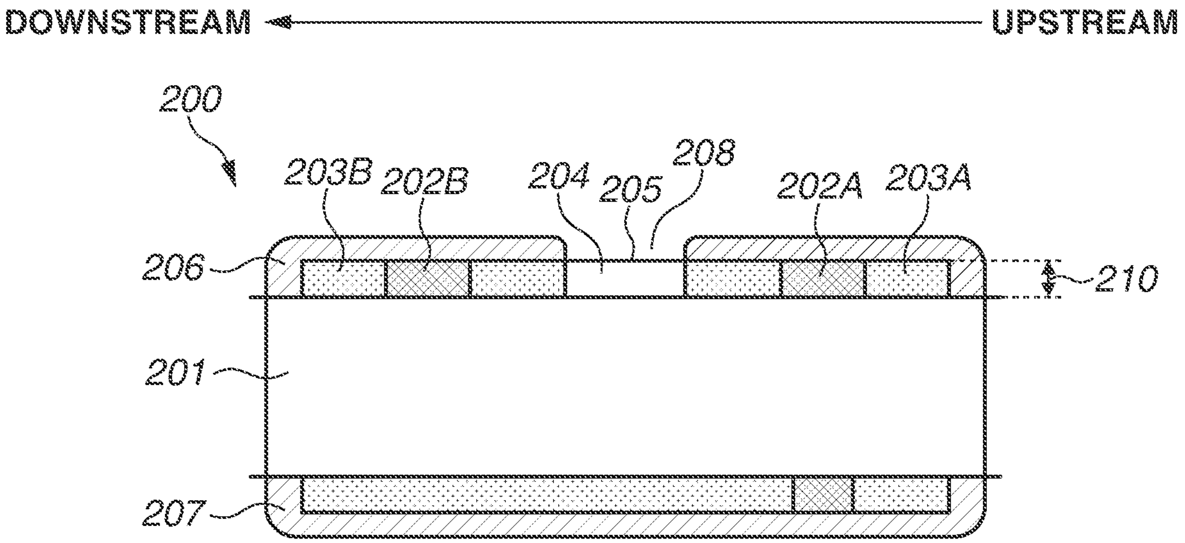
FIG. 5 is a sectional view of a heater in a widthwise direction.

The heater 200 according to the present exemplary embodiment will be described in detail with reference to FIGS. 4, 5, and 6A to 6C. FIG. 5 is a sectional view of the heater 200 in the widthwise direction (the conveyance direction of the recording material P). The heater 200 generates heat by supply of power to the heat generating elements 202A and 202B disposed in a conductive layer 210 on the heater substrate 201 made of ceramic. In the conductive layer 210, a first conductive element 203 and a second conductive element 204 are disposed along the longitudinal direction of the heater 200. The first conductive element 203 includes first conductive elements 203A and 203B diverging from the first conductive element 203. The first conductive elements 203A and 203B are disposed on the upstream side and the downstream side, respectively, of the conveyance direction of the recording material P. The second conductive element 204 is disposed between the heat generating elements 202A and 202B. In the widthwise direction of the heater 200, the first conductive elements 203A and 203B are disposed so that the heat generating elements 202A and 202B and the second conductive element 204 are interposed therebetween. In the arrangement example in FIG. 5, the first conductive element 203A, the heat generating element 202A, the second conductive element 204, the heat generating element 202B, and the first conductive element 203B are arranged in this order from the upstream side to the downstream side of the conveyance direction of the recording material P. Further, an insulating protective layer (a glass layer) 206 covering the heat generating elements 202A and 202B, the first conductive elements 203A and 203B, and the second conductive element 204 is disposed on the back surface of the heater 200. The sliding layer 207 formed by coating using glass or polyimide having superior slidability is disposed on the side where the sliding surface of the heater 200 slides on the film 103. The heater 200 includes a heat generating block including the heat generating elements 202A and 202B.

Figures 6A, 6B, 6C:
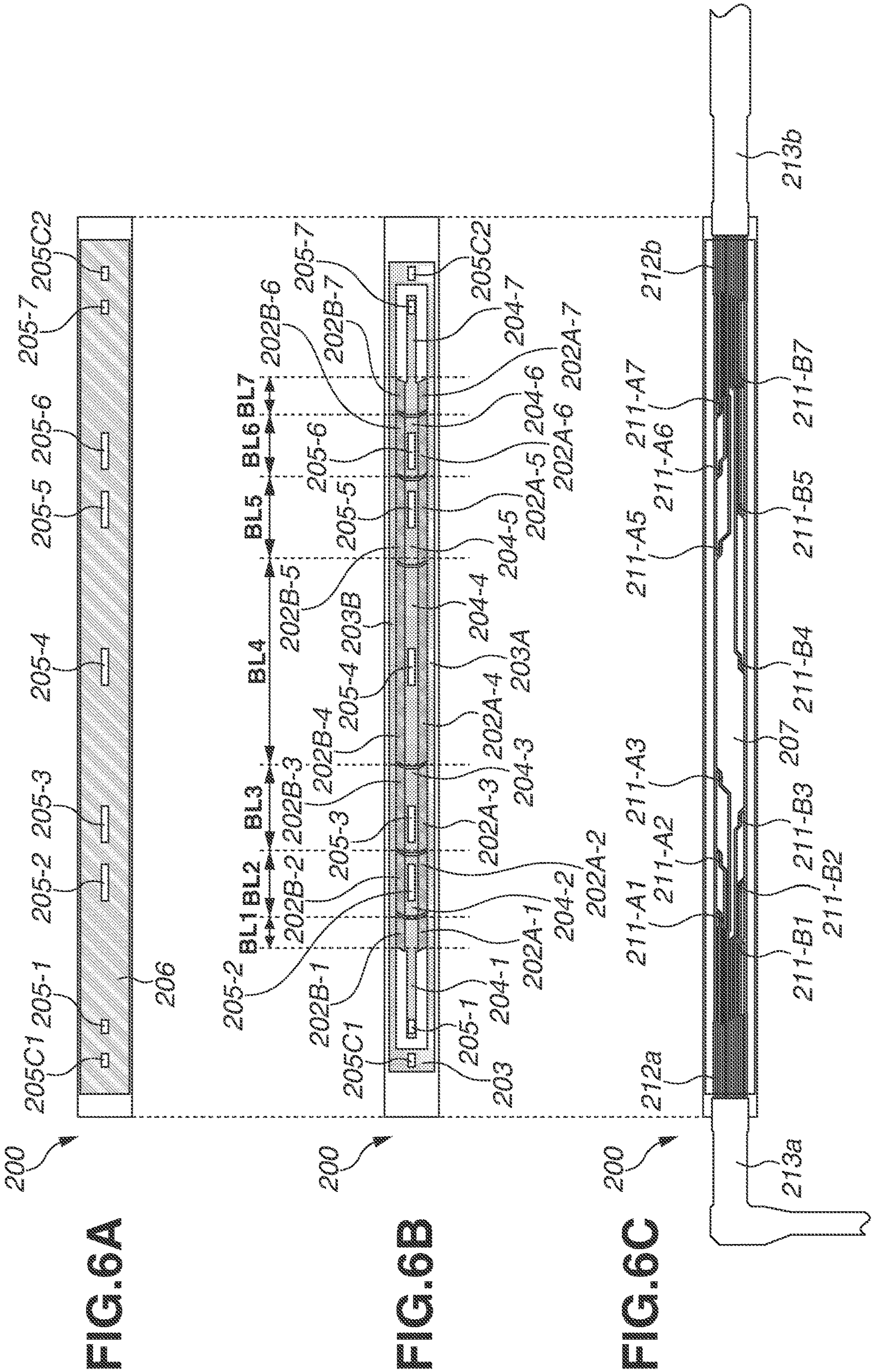
FIGS. 6A to 6C are plan views of the heater.

FIGS. 6A to 6C are plan views of the heater 200. FIG. 6A illustrates the back surface of the heater 200, and FIG. 6B illustrates a state where the protective layer 206 is removed from the back surface of the heater 200. FIG. 6C illustrates the surface of the heater 200 in a state where the sliding layer 207 is removed.

The heater 200 includes a plurality of heat generating blocks BL1 to BL7 arranged in the longitudinal direction of the heater 200. The heat generating block BL1 includes heat generating elements 202A-1 and 202B-1. The heat generating block BL2 includes heat generating elements 202A-2 and 202B-2. The heat generating block BL3 includes heat generating elements 202A-3 and 202B-3. The heat generating block BL4 includes heat generating elements 202A-4 and 202B-4. The heat generating block BL5 includes heat generating elements 202A-5 and 202B-5. The heat generating block BL6 includes heat generating elements 202A-6 and 202B-6. The heat generating block BL7 includes heat generating elements 202A-7 and 202B-7. The heater 200 of the present exemplary embodiment includes the seven heat generating blocks BL1 to BL7.

The first conductive element 203 is disposed along the longitudinal direction of the heater 200. The first conductive element 203 includes the first conductive element 203A connected to the heat generating elements 202A-1 to 202A-7, and the first conductive element 203B connected to the heat generating elements 202B-1 to 202B-7. The second conductive element 204 includes a second conductive element 204-1 connected to the heat generating element 202A-1 and the heat generating element 202B-1, and a second conductive element 204-2 connected to the heat generating element 202A-2 and the heat generating element 202B-2. The second conductive element 204 further includes a second conductive element 204-3 connected to the heat generating element 202A-3 and the heat generating element 202B-3, a second conductive element 204-4 connected to the heat generating element 202A-4 and the heat generating element 202B-4, and a second conductive element 204-5 connected to the heat generating element 202A-5 and the heat generating element 202B-5. The second conductive element 204 further includes a second conductive element 204-6 connected to the heat generating element 202A-6 and the heat generating element 202B-6, and a second conductive element 204-7 connected to the heat generating element 202A-7 and the heat generating element 202B-7. The second conductive elements 204-1 to 204-7 are arranged apart from each other. Therefore, the second conductive element 204 is divided into seven.

Common electrodes 205C1 and 205C2 and electrodes 205-1 to 205-7 are each exposed from the corresponding one of a plurality of opening portions 208 located in the protective layer 206. The common electrodes 205C1 and 205C2 are part of the first conductive element 203. The electrodes 205-1 to 205-7 are part of the second conductive elements 204-1 to 204-7, respectively. The electrode 205-1 is an electrode for supplying power to the heat generating block BL1. The electrode 205-2 is an electrode for supplying power to the heat generating block BL2, and the electrode 205-3 is an electrode for supplying power to the heat generating block BL3. Similarly, the electrodes 205-4 to 205-7 are electrodes for supplying power to the heat generating blocks BL4 to BL7, respectively. The common electrodes 205C1 and 205C2 are common electrodes for supplying power to the heat generating blocks BL1 to BL7 via the first conductive elements 203A and 203B.

The heater 200 can supply power to each of the heat generating blocks BL1 to BL7 independently, via the electrodes 205-1 to 205-7. It is possible to suppress the temperature rise of a non-sheet-passing area through which the recording material P does not pass, by changing the proportion of the power to be supplied to each of the heat generating blocks BL1 to BL7. For example, when a toner image formed on the recording material P having a width corresponding to the heat generating blocks BL3 to BL5 is fixed to the recording material P by heat, the power to be supplied to each of the heat generating blocks BL1, BL2, BL6, and BL7 is made to be smaller than the power to be supplied to each of the heat generating blocks BL3 to BL5. The temperature rise of the non-sheet-passing area can be thereby reduced. The proportion of the power to be supplied to each of the heat generating blocks BL1 to BL7 may be changed depending on the width of an image to be formed on the recording material P.

Meanwhile, the printer 1 is configured so that the center of the recording material P passes through the center of the heat generating block BL4 in the longitudinal direction of the heater 200. The heat generating block BL4 located as the middle of the plurality of heat generating blocks is a heat generating block through which the recording material P always passes regardless of the size of the recording material P. In the longitudinal direction of the heater 200, the size of each of the heat generating blocks BL2 (a first heat generating block), BL3 (a second heat generating block), BL5 (a third heat generating block), and BL6 (a fourth heat generating block) is smaller than the size of the heat generating block BL4 (a fifth heat generating block). Therefore, the distance between the electrode 205-2 and the electrode 205-3 and the distance between the electrode 205-5 and the electrode 205-6 are short.

Thermistors 211-A1 to 211-A3, 211-A5 to 211-A7, 211-B1 to 211-B5, and 211-B7 each serving as a temperature detection element are printed on a surface, which faces the film 103, of the heater substrate 201. These twelve thermistors may be collectively referred to as the thermistor 211. The thermistors 211-A1 and 211-B1 detect the temperature of an area corresponding to the heat generating block BL1. The thermistors 211-A2 and 211-B2 detect the temperature of an area corresponding to the heat generating block BL2. The thermistors 211-A3 and 211-B3 detect the temperature of an area corresponding to the heat generating block BL3. The thermistor 211-B4 detects the temperature of an area corresponding to the heat generating block BL4. The thermistors 211-A5 and 211-B5 detect the temperature of an area corresponding to the heat generating block BL5. The thermistor 211-A6 detects the temperature of an area corresponding to the heat generating block BL6. The thermistors 211-A7 and 211-B7 detect the temperature of an area corresponding to the heat generating block BL7. Each of the plurality of heat generating blocks BL1 to BL7 is controlled to be maintained at a predetermined target temperature, during a fixing process. The thermistor 211 is used to control the temperature of each of the plurality of heat generating blocks BL1 to BL7 or to prevent an abnormal temperature rise in each of the plurality of heat generating blocks BL1 to BL7.

Two conductive elements are connected to each of the plurality of thermistors 211. A conductive element 212*a* illustrated in FIG. 6C indicates a conductive element connected to a flexible printed circuit (FPC) 213*a*, and a conductive element 212*b* illustrated in FIG. 6C indicates a conductive element connected to an FPC 213*b*.

The conductive element 212*a* and the FPC 213*a* are soldered, and the conductive element 212*b* and the FPC 213*b* are also soldered. As illustrated in FIG. 4, the FPC 213*a* and the FPC 213*b* wrap around to the rear surface of the fixing device 100. The end portion opposite to the end portion, which is connected to the heater 200, of the FPC 213*a* and that of the FPC 213*b* are connected to an electric substrate 214 disposed on the rear surface of the fixing device 100, by connectors 333*a* and 333*b*, respectively. The FPC 213 (213*a*, 213*b*) is a flat cable formed by laminating a conductive metal to a thin base film made of a material having insulating properties such as polyimide.

(Configuration for Power Supply to Heater)

Figure 7:
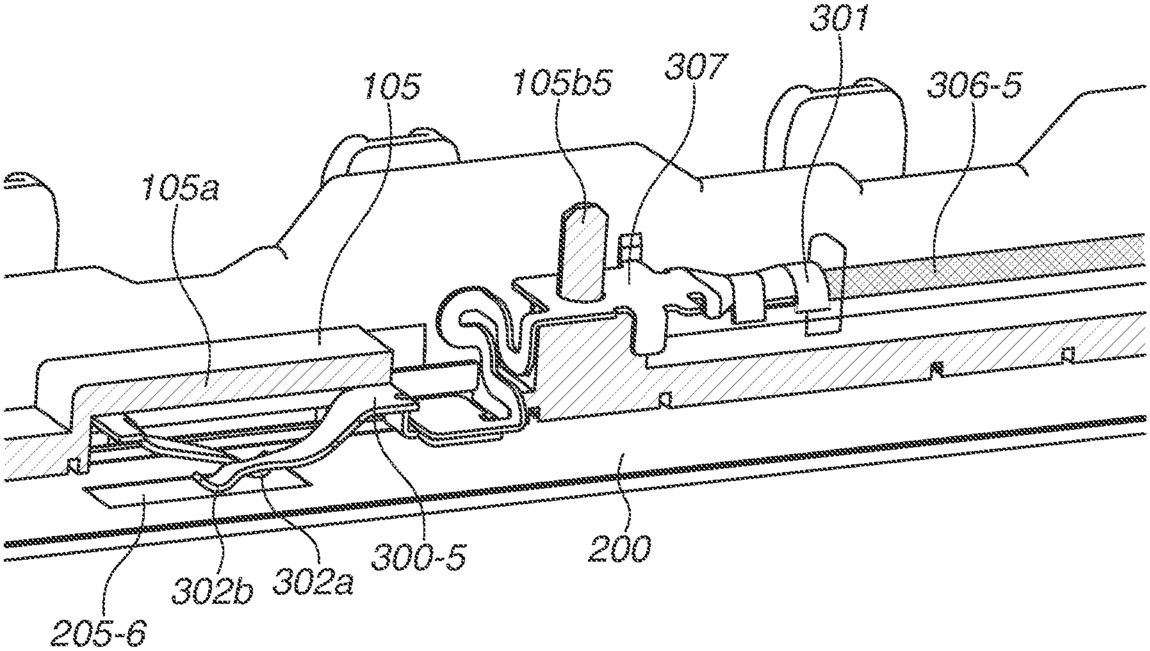
FIG. 7 is a partial perspective view of a power supply unit for the heater.
Figure 8:
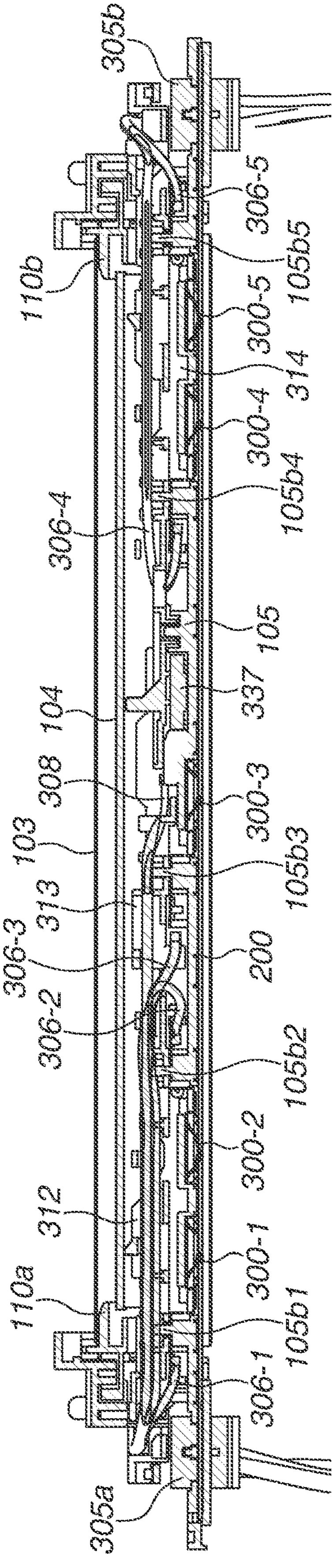
FIG. 8 is an overall view of the power supply unit for the heater.
Figure 9:
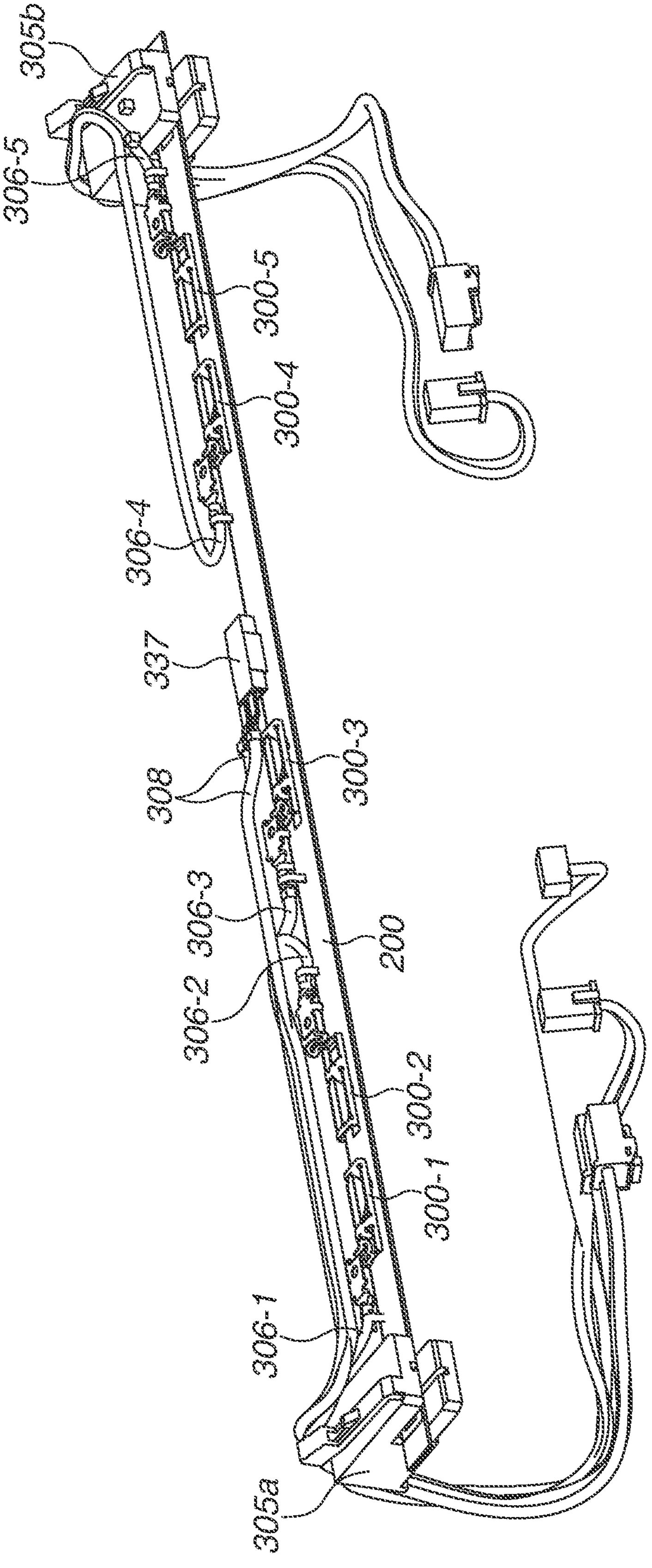
FIG. 9 is an overall perspective view of the power supply unit for the heater.
Figure 10:
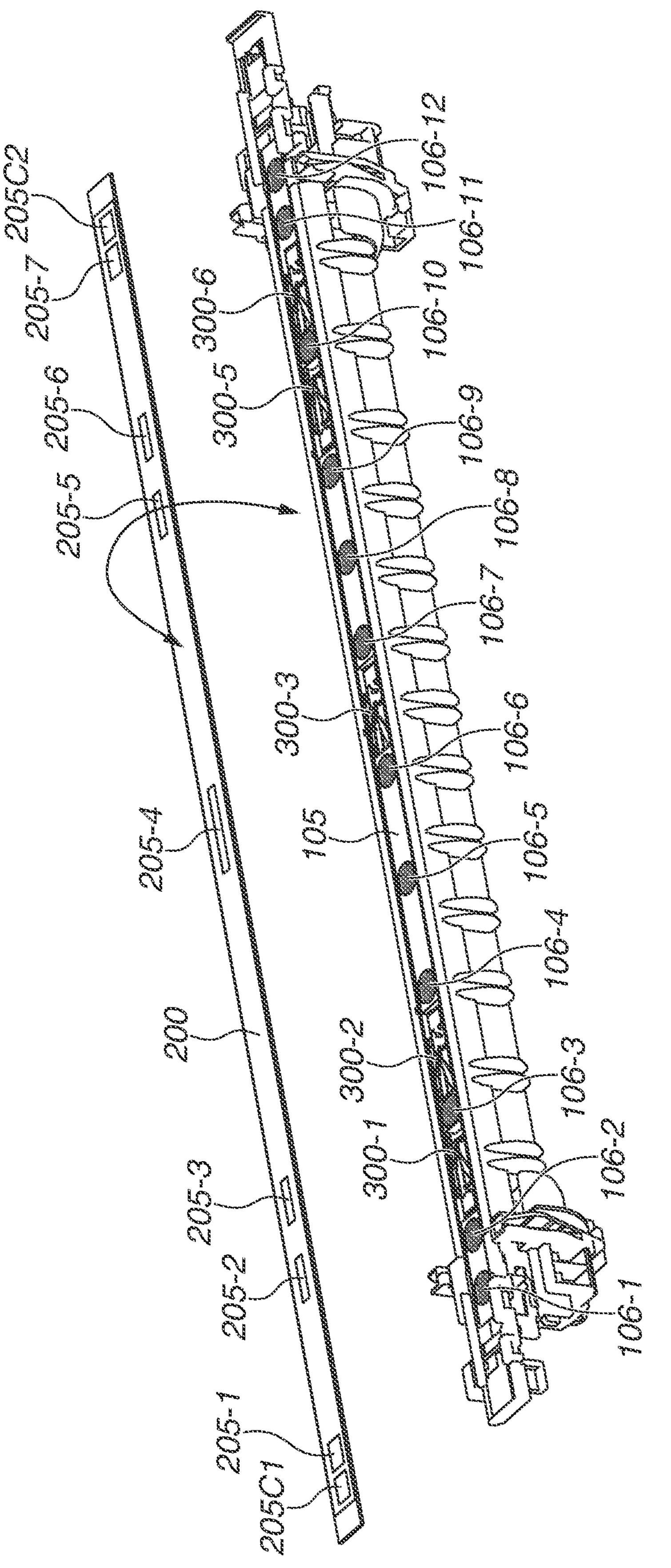
FIG. 10 is a perspective view illustrating the relationship between the heater and a holding member.
Figure 11:
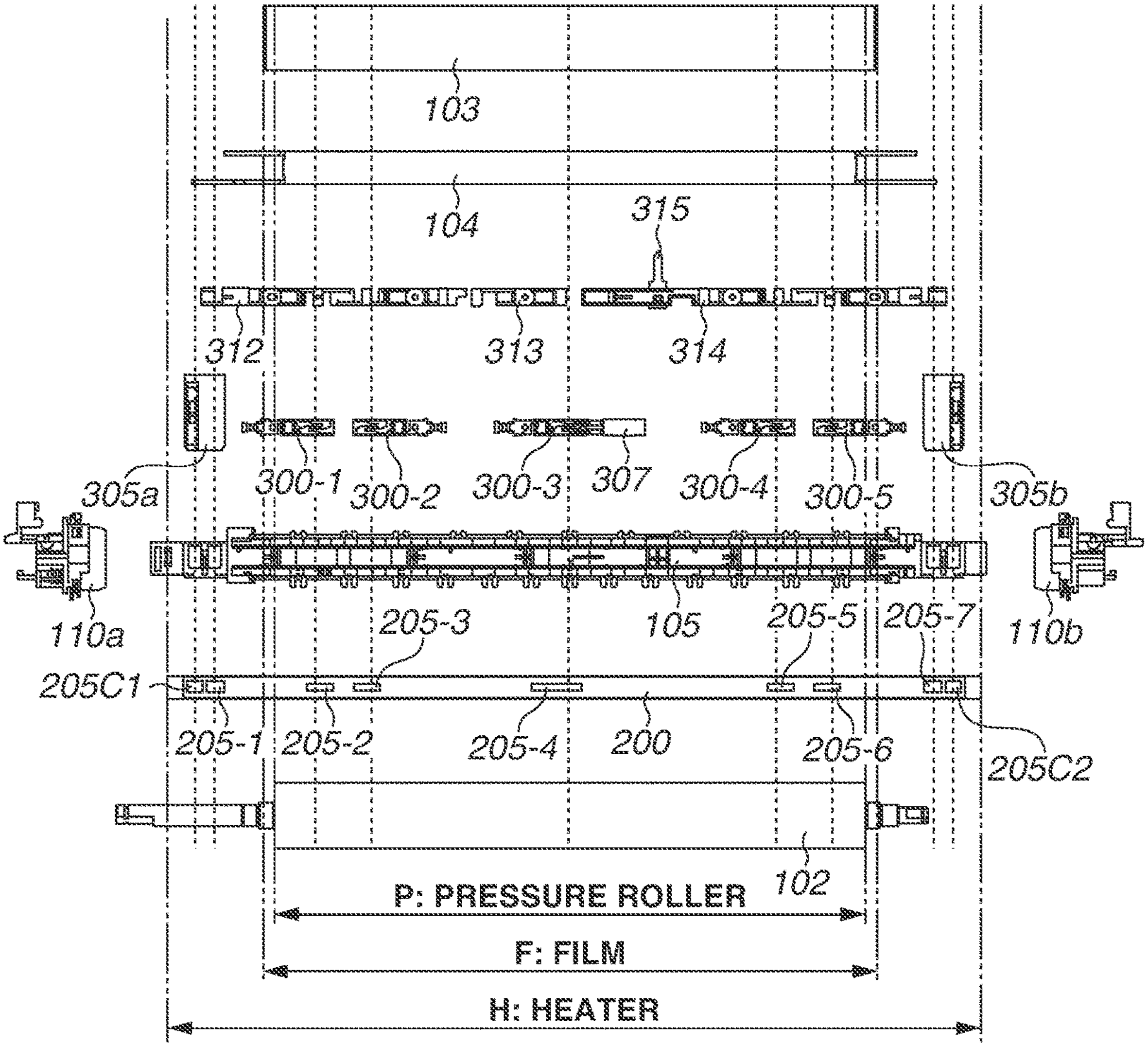
FIG. 11 is an exploded plan view illustrating the positional relationship between components forming the heating unit and the pressure roller in the longitudinal direction of the fixing device.

A power supply unit for supplying power to the electrode 205 of the heater 200 will be described with reference to FIGS. 7 to 11. FIG. 7 is a partial perspective view of the power supply unit for the heater 200, and FIG. 8 is an overall view of the power supply unit for the heater 200. FIG. 9 is an overall perspective view of the power supply unit for the heater 200, and FIG. 10 is a perspective view illustrating the relationship between the heater 200 and the holding member 105. FIG. 11 is an exploded plan view illustrating the positional relationship between components forming the heating unit 101 and the pressure roller 102 in the longitudinal direction of the fixing device 100. The power supply structures for the heat generating blocks BL2 to BL6 are substantially the same except for the orientation of a power supply terminal 300 and the wiring direction of a cable 306. FIG. 7 illustrates the power supply structure for the heat generating block BL6 representing the heat generating blocks BL2 to BL6, and the detailed description of the power supply structures for the other heat generating blocks BL2 to BL5 will be omitted.

A power supply terminal 300-5 is a metal pressed component, and includes contact portions 302*a* and 302*b*, a mount portion 307, and a connection portion 301. The contact portions 302*a* and 302*b* are portions in contact with the electrode 205-6. The contact portions 302*a* and 302*b* have spring characteristics, and vary in elasticity. Therefore, the magnitude of a load when pressing the contact portion 302*a* against the electrode 205-6 and the magnitude of a load when pressing the contact portion 302*b* against the electrode 205-6 are different. This is to prevent the two contact portions 302*a* and 302*b* from vibrating at the same frequency, with respect to vibrations occurring in a motor or the like inside the printer 1, or vibrations occurring when the recording material P passes through the fixing nip portion N. Such a configuration of the contact portions 302*a* and 302*b* can minimize the possibility that the two contact portions 302*a* and 302*b* simultaneously move away from the electrode 205-6.

The power supply terminal 300-5 crimps (connects) a cable (a power supply cable) 306-5, using the connection portion 301. As illustrated in FIG. 4, the cable 306-5 wraps around to the rear surface of the fixing device 100, and is connected to a connector 311-1 of the electric substrate 214 disposed on the rear surface.

The power supply terminal 300-5 is attached to the holding member 105 by inserting a boss **105*b*5 of the holding member 105 into the mount portion 307. FIG. 9 illustrates a power supply terminal 300-1 in contact with the electrode 205-2 for the heat generating block BL2, and a power supply terminal 300-2 in contact with the electrode 205-3 for the heat generating block BL3. FIG. 9 further illustrates a power supply terminal 300-3 in contact with the electrode 205-4 for the heat generating block BL4, a power supply terminal 300-4 in contact with the electrode 205-5 for the heat generating block BL5, and the power supply terminal 300-5 in contact with the electrode 205-6 for the heat generating block BL6. FIG. 8 illustrates a boss 105*b*1 inserted into the power supply terminal 300-1, and a boss 105*b*2 inserted into the power supply terminal 300-2. FIG. 8 further illustrates a boss 105*b*3 inserted into the power supply terminal 300-3, a boss 105*b*4 inserted into the power supply terminal 300-4, and the boss 105*b*5 inserted into the power supply terminal 300-5**.

As illustrated in FIG. 8, a contact holder 312 that guides a cable 306-1 crimped to the power supply terminal 300-1, a cable 306-2 crimped to the power supply terminal 300-2, and a cable 306-3 crimped to the power supply terminal 300-3 is disposed on the power supply terminals 300-1 and 300-2. The contact holder 312 is attached to the boss **105*b*1 and the boss 105*b*2. A contact holder 313 that guides the cable 306-3 crimped to the power supply terminal 300-3 and a cable 308 crimped to a safety element (a thermal switch) 337 is disposed on the power supply terminal 300-3. The safety element 337 is an element disposed at a power supply circuit for supplying power from a power supply (not illustrated) to the heat generating blocks BL1 to BL7, and operates to break the power supply circuit if the temperature of the heater 200 rises to an abnormal temperature. The contact holder 313 is attached to the boss 105*b*3. A contact holder 314 that guides a cable 306-4 crimped to the power supply terminal 300-4 and the cable 306-5 crimped to the power supply terminal 300-5 is disposed on the power supply terminals 300-4 and 300-5. The contact holder 314 is attached to the boss 105*b*4 and the boss 105*b*5. FIG. 7 illustrates a state where the contact holder 314** is removed.

After the contact holders 312, 313, and 314 are attached to the bosses **105*b*1 to 105*b*5 of the holding member 105 made of resin, the bosses 105*b*1 to 105*b*5 are flattened by heat for crimping, so that the contact holders 312, 313, and 314 are prevented from coming off. Therefore, the structure for preventing the power supply terminals 300-1 to 300-5 from coming off serves as a structure for preventing the contact holders 312, 313, and 314 from coming off. If the bosses 105*b*1 to 105*b*5 made of resin are used as the structure for preventing the contact holders 312, 313, and 314 from coming off in a structure where the distance between the power supply terminals 300-1 to 300-5 and the stay member 104 made of metal is short, an insulation distance therebetween is easily secured. This can prevent an electrical short circuit between the power supply terminals 300-1 to 300-5 and the stay member 104. In addition, attaching the plurality of power supply terminals 300-1 to 300-5 to the one holding member 105** can improve the positional accuracy between the power supply terminals close to each other, so that an electrical short circuit between the power supply terminals can also be prevented.

The plurality of power supply terminals 300-1 to 300-5 urge the heater 200 by constant contact pressure. Therefore, as illustrated in FIG. 10, the heater 200 is fixed to the holding member 105 by adhesion using adhesion portions 106-1 to 106-12, in order to prevent the relative position between the heater 200 and the holding member 105 from changing. The temperature of the heater 200 is high when generating heat, so that thermal expansion and thermal contraction of the heater substrate 201 occur. Therefore, the heater 200 and the holding member 105 are adhered to each other using a silicon adhesive having heat resistance and elasticity in order to maintain the adhesion strength. Further, the adhesion portions 106-1 to 106-12 of the holding member 105 have a knurled shape, in order to enhance the adhesion strength by increasing the area of a surface to which the adhesive is applied. The contact pressure of the contact portions of the power supply terminals 300-1 to 300-5 is thereby stabilized. Moreover, because the heater 200 is fixed to the holding member 105, abrasion of the contact portion due to misregistration between the electrode and the contact portion is also prevented, so that the reliability of the electrical contact improves.

As illustrated in FIGS. 9 and 10, two power supply terminals (not illustrated), one is in contact with the common electrode 205C1 at one end portion of the heater 200 and the other is in contact with the electrode 205-1 for the heat generating block BL1, are disposed inside a connector **305*a* inserted into the heater 200 in the widthwise direction of the heater 200. Further, two power supply terminals (not illustrated), one is in contact with the common electrode 205C2 at the other end portion of the heater 200 and the other is in contact with the electrode 205-7 for the heat generating block BL7, are disposed inside a connector 305*b* inserted into the heater 200 in the widthwise direction of the heater 200**.

As illustrated in FIG. 11, the electrodes 205-2 to 205-6 are disposed within the area of the film 103 in the longitudinal direction of the heater 200. On the other hand, the common electrodes 205C1 and 205C2 and the electrodes 205-1 and 205-7 are disposed outside the area of the film 103 (outside both end portions of the film 103) in the longitudinal direction of the heater 200. In this way, the number of components built in the film 103 is decreased by reducing the power supply terminals disposed in the internal space of the film 103, so that the outer diameter of the film 103 can be reduced, and thus the heating unit 101 can be downsized.

A member 315 is a discharging member in contact with an inner surface of the film 103, and prevents toner from offsetting with respect to the film 103 because of charge of the film 103.

The distance between the electrode 205-2 (a first electrode) and the electrode 205-3 (a second electrode) next to each other in the longitudinal direction of the heater 200 is short. Therefore, the distance between the power supply terminal 300-1 (a first power supply terminal) and the power supply terminal 300-2 (a second power supply terminal) next to each other in the longitudinal direction of the heater 200 is also short. Similarly, the distance of the electrode 205-5 (a third electrode) and the electrode 205-6 (a fourth electrode) next to each other in the longitudinal direction of the heater 200 is short. Therefore, the distance between the power supply terminal 300-4 (a third power supply terminal) and the power supply terminal 300-5 (a fourth power supply terminal) next to each other in the longitudinal direction of the heater 200 is also short. For this reason, in a case where the power supply terminal 300-1 (the first power supply terminal) and the power supply terminal 300-2 (the second power supply terminal) are disposed to face in the same direction, these power supply terminals can interfere with each other. Similarly, in a case where the power supply terminal 300-4 (the third power supply terminal) and the power supply terminal 300-5 (the fourth power supply terminal) are disposed to face in the same direction, these power supply terminals can interfere with each other. The heater 200 of the present exemplary embodiment includes the heat generating block BL4 (the fifth heat generating block) whose size in the longitudinal direction of the heater 200 is larger than those of the first to fourth heat generating blocks BL2, BL3, BL5, and BL6 in contact with the first to fourth power supply terminals, respectively.

Therefore, as illustrated in FIGS. 8, 9, and 11, the power supply terminal 300-1 and the power supply terminal 300-2 are disposed to be opposite to each other in terms of orientation (in terms of the positional relationship between the contact portion and the connection portion in the longitudinal direction of the heater). Specifically, the connection portion of the power supply terminal 300-1 faces in the direction toward one end portion (the end portion on the common electrode 205C1 side) of the heater 200 in the longitudinal direction of the heater 200. The connection portion of the power supply terminal 300-2 faces in the direction toward the other end portion (the end portion on the common electrode 205C2 side) of the heater 200. The power supply terminals are thereby prevented from interfering with each other.

Further, the cable 306-1 connected to the connection portion of the power supply terminal 300-1 extends toward the one end portion (the end portion on the common electrode 205C1 side) of the heater 200. Further, the cable 306-2 connected to the connection portion of the power supply terminal 300-2 is bent from extending in the direction toward the other end portion of the heater 200 to extend toward the one end portion of the heater 200. The two cables 306-1 and 306-2 can be thereby drawn from the same end portion of the film 103 in the longitudinal direction of the heater 200, so that the heating unit 101 can be downsized.

Similarly, the power supply terminal 300-4 and the power supply terminal 300-5 are disposed to be opposite to each other in terms of orientation. Specifically, the connection portion of the power supply terminal 300-4 faces in the direction toward the one end portion (the end portion on the common electrode 205C1 side) of the heater 200 in the longitudinal direction of the heater 200. The connection portion of the power supply terminal 300-5 faces in the direction toward the other end portion (the end portion on the common electrode 205C2 side) of the heater 200. The power supply terminals are thereby prevented from interfering with each other. Further, the cable 306-4 connected to the connection portion of the power supply terminal 300-4 is bent from extending in the direction toward the one end portion of the heater 200 to extend toward the other end portion of the heater 200. The cable 306-5 connected to the connection portion of the power supply terminal 300-5 extends toward the other end portion of the heater 200. The two cables 306-4 and 306-5 can be thereby drawn from the same end portion of the film 103 in the longitudinal direction of the heater 200, so that the device can be downsized.

The cables 306-1 and 306-2 extend toward the one end portion of the heater 200, and the cables 306-4 and 306-5 extend toward the other end portion of the heater 200. Therefore, there is no area where all the four cables 306-1, 306-2, 306-4, and 306-5 overlap at an arbitrary point in the longitudinal direction of the heater 200, and thus the diameter of the film 103 can be reduced. Moreover, the length of the cable to be used can also be reduced.

Further, the safety element 337 is disposed in an area where none of the four cables 306-1, 306-2, 306-4, and 306-5 is present, in the longitudinal direction of the heater 200. The heating unit 101 can be thereby further downsized.

Next, the placement of the cables 306 and 308 and the FPC 213 extending from the heating unit 101 will be described.

The cables 306 and 308 and the FPC 213 drawn from the heating unit 101 pass on the outer side of the support frames 111*a* and 111*b* from both end portions of the heating unit 101, and are connected to the electric substrate 214 disposed on the rear surface of the fixing device 100, using cable connectors 309 and 311. The cables 306 and 308 are placed in a path close to the support frames 111*a* and 111*b*, from the heating unit 101 to the electric substrate 214, in order to prevent the FPC 213 from being bent or torn. The FPC 213 is placed farther away from the support frames 111*a* and 111*b* than the cables 306 and 308. The FPC 213*a* on the side where the idler gear 114 and the drive gear 115 are disposed has an FPC shape extending in a direction perpendicular to the longitudinal direction of the heater 200, to be prevented from being caught in the gear. The cables 306 and 308 and the FPC 213 may be placed separately, and, for example, the FPC 213 may be placed after the cables 306 and 308 are placed.

The electric substrate 214 disposed on the rear surface of the fixing device 100 is attached to a substrate holding member 215 attached to the support frame 111C, and is covered by a cover member (not illustrated) attached to the substrate holding member 215. This achieves electrical insulation between electric components mounted on the electric substrate 214 and the support frame 111C, and prevents attachment of water drops to the electric components due to moisture generated when the recording material P is pinched and conveyed through the fixing nip portion N. Cables for supplying power to the heater 200, a plurality of sensors, the safety element 337, and the like and a cable connected to a drawer connector 310 for electrically connecting to the main body of the printer 1 are connected to the electric substrate 214. As illustrated in FIG. 3, multiple grooves having a small pitch and extending in a pressure roller axial direction are located on the surface on the supporting frame 111*c* side in the substrate holding member 215, in order to prevent the water drops due to the condensation of the moisture generated from the fixing nip portion N from falling. The water drops are thereby kept in the grooves, and thus prevented from falling downward in the fixing device 100. In the present exemplary embodiment, the grooves have a width of 1.0 mm, a depth of 0.5 mm, and a pitch of 2.0 mm, but are not limited thereto, and these values may be freely set.

In FIG. 4, a connector 309-*a*1 is a connector connected to a cable extending from the power supply terminal in contact with the electrode 205-1 of the heat generating block BL and a cable extending from the power supply terminal in contact with the common electrode 205C1. A connector 309-*b*1 is a connector connected to a cable extending from the power supply terminal in contact with the electrode 205-7 of the heat generating block BL7 and a cable extending from the power supply terminal in contact with the common electrode 205C2. A connector 309-*a*2 is a connector connected to the cable 306-3 extending from the power supply terminal 300-3 in contact with the electrode 205-4 of the heat generating block BL4. The connector 311-1 is a connector connected to the cable 306-4 extending from the power supply terminal 300-4 in contact with the electrode 205-5 of the heat generating block BL5 and the cable 306-5 extending from the power supply terminal 300-5 in contact with the electrode 205-6 of the heat generating block BL6. A connector 311-2 is a connector connected to the cable 308 extending from the safety element (thermal switch) 337. A connector 311-3 is a connector connected to a cable of a secondary power supply for driving a central processing unit (CPU) or the like. A connector 311-4 is a connector connected to a cable of the sensor 120 for detecting the rotation phase of the cam 116. A connector 311-5 is a connector connected to a cable of a power supply for driving the thermistors 211-A1 to 211-A3, 211-A5 to 211-A7, 211-B1 to 211-B5, and 211-B7. A connector 311-6 is a connector connected to the cable 306-1 extending from the power supply terminal 300-1 in contact with the electrode 205-2 of the heat generating block BL2 and the cable 306-2 extending from the power supply terminal 300-2 in contact with the electrode 205-3 of the heat generating block BL3. As illustrated in FIGS. 8 and 9, a part of the plurality of power supply cables extends from one end portion of the film 103 in the longitudinal direction of the heater 200 to the outside of the film 103, and the rest of the plurality of power supply cables extends from the other end portion of the film 103 to the outside of the film 103. Further, the number of the power supply cables extending from the one end portion of the film 103 to the outside of the film 103 is an even number, and the number of the power supply cables extending from the other end portion of the film 103 to the outside of the film 103 is an odd number.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2022-091291, filed Jun. 6, 2022, which is hereby incorporated by reference herein in its entirety.

What is claimed is:

1. A fixing device that fixes a toner image formed on a recording material to the recording material by heat, the fixing device comprising:

a film having a cylindrical shape;

a heater provided in an internal space of the film, the heater including a substrate, and a plurality of heat generating blocks located on the substrate and arranged in a longitudinal direction of the heater;

a plurality of power supply terminals in contact with electrodes of the respective plurality of heat generating blocks; and a plurality of power supply cables connected to the respective plurality of power supply terminals, wherein each of the plurality of power supply terminals includes a contact portion in contact with the electrode and a connection portion connected to the power supply cable, wherein the plurality of heat generating blocks includes a first heat generating block and a second heat generating block next to each other in the longitudinal direction, wherein the plurality of power supply terminals includes a first power supply terminal in contact with the first heat generating block and a second power supply terminal in contact with the second heat generating block, the first power supply terminal and the second power supply terminal being located in the internal space of the film, wherein the connection portion of the first power supply terminal is at a position closer to one end portion of the heater in the longitudinal direction than the contact portion of the first power supply terminal, and the connection portion of the second power supply terminal is at a position closer to the other end portion of the heater in the longitudinal direction than the contact portion of the second power supply terminal, wherein the power supply cable connected to the connection portion of the first power supply terminal extends toward the one end portion of the heater, wherein the power supply cable connected to the connection portion of the second power supply terminal is bent from extending toward the other end portion of the heater to extend toward the one end portion of the heater, wherein the plurality of heat generating blocks includes a third heat generating block and a fourth heat generating block next to each other in the longitudinal direction, wherein the plurality of power supply terminals includes a third power supply terminal in contact with the third heat generating block and a fourth power supply terminal in contact with the fourth heat generating block, the third power supply terminal and the fourth power supply terminal being located in the internal space of the film, wherein the connection portion of the third power supply terminal is at a position closer to the one end portion of the heater in the longitudinal direction than the contact portion of the third power supply terminal, and the connection portion of the fourth power supply terminal is at a position closer to the other end portion of the heater in the longitudinal direction than the contact portion of the fourth power supply terminal, wherein the power supply cable connected to the connection portion of the third power supply terminal is bent from extending toward the one end portion of the heater to extend toward the other end portion of the heater, and wherein the power supply cable connected to the connection portion of the fourth power supply terminal extends toward the other end portion of the heater.

2. The fixing device according to claim 1, wherein the plurality of heat generating blocks includes a fifth heat generating block as a middle block in the longitudinal direction, wherein the plurality of power supply terminals includes a fifth power supply terminal in contact with the fifth heat generating block, the fifth power supply terminal being located in the internal space of the film, wherein the connection portion of the fifth power supply terminal is at a position closer to the one end portion of the heater in the longitudinal direction than the contact portion of the fifth power supply terminal, and wherein the power supply cable connected to the connection portion of the fifth power supply terminal extends toward the one end portion of the heater.

3. The fixing device according to claim 1, further comprising a roller in contact with an outer peripheral surface of the film, wherein the film is provided between the heater and the roller, and a fixing nip portion for pinching and conveying the recording material is provided between the film and the roller.

4. A fixing device that fixes a toner image formed on a recording material to the recording material by heat, the fixing device comprising:

a film having a cylindrical shape;

a heater provided in an internal space of the film, the heater including a substrate, and a plurality of heat generating blocks located on the substrate and arranged in a longitudinal direction of the heater;

a plurality of power supply terminals formed of metal pressed component in contact with electrodes of the respective plurality of heat generating blocks; and a plurality of power supply cables connected to the respective plurality of power supply terminals, wherein a part of the plurality of power supply cables extends from one end portion of the film in the longitudinal direction to an outside of the film, and a rest of the plurality of power supply cables extends from the other end portion of the film in the longitudinal direction to the outside of the film, and wherein a number of the power supply cables extending from the one end portion of the film to the outside of the film is an even number, and a number of the power supply cables extending from the other end portion of the film to the outside of the film is an odd number.

5. The fixing device according to claim 4, further comprising a roller in contact with an outer peripheral surface of the film, wherein the film is provided between the heater and the roller, and a fixing nip portion for pinching and conveying the recording material is provided between the film and the roller.

* * * * *